(No Model.)

L. T. STANLEY.
DEVICE FOR TESTING COLOR BLINDNESS.

No. 404,366. Patented May 28, 1889.

WITNESSES:
Raphaël Netter
Frank E. Hartley

INVENTOR,
Lucius T. Stanley
BY
Duncan Curtis & Page
ATTORNEYS.

UNITED STATES PATENT OFFICE.

LUCIUS T. STANLEY, OF BROOKLYN, ASSIGNOR TO DAVID L. PROUDFIT, OF NEW YORK, N. Y.

DEVICE FOR TESTING COLOR-BLINDNESS.

SPECIFICATION forming part of Letters Patent No. 404,366, dated May 28, 1889.

Application filed August 15, 1888. Serial No. 282,771. (No model.)

*To all whom it may concern:*

Be it known that I, LUCIUS T. STANLEY, of Brooklyn, in the county of Kings and State of New York, have invented certain new and useful Improvements in Devices for Testing Color-Blindness, of which the following is a full, clear, and exact description, reference being had to the accompanying drawings.

This invention relates to a device or apparatus for testing the power of the human eye to discern colors, or, in other words, to ascertain if a person have color-blindness.

It is a generally-accepted fact that solar or white light is composed of three colors—red, yellow, and blue—which are termed "primary colors," because all other colors are composed of them. Normally the eye sees white light—that is, white light has no secondary or divided effect upon the eye; but with the colors there is a secondary action of the eye or an action supplemental to that which discerns the color presented—that is to say, when a colored light is presented to the organs of sight, their effort is to reduce such colored light to a white light, and in so doing they not only take cognizance of the color being viewed, but they also strive to bring up the tint or color that added to the viewed color would produce white light. Such added color is of course one that is complementary of the color presented to the eye; the colors that are complementary of the primary colors are known as "secondaries," they being purple, green, and orange. With this explanation of well-known optical laws, it will now be plain that if a person's eyes fail to discover the color complementary to that being viewed, when the test is conducted so that the complementary color or tint may be observed separately from the primary, then it must follow that there is inability of such an one's organs of vision with reference to that complementary color or tint, and the person would be termed "color-blind" as to such complementary color.

My invention consists, therefore, of means for thus testing a person's powers of vision, which means will be now described, and the novel parts thereof will be specifically pointed out in the claims to follow such description.

Figure 1:
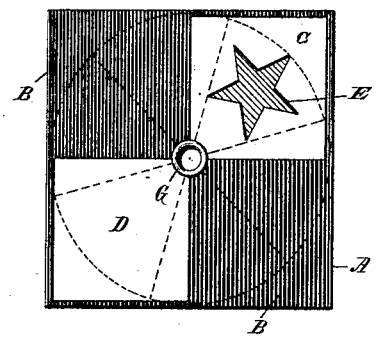
Figure 2:
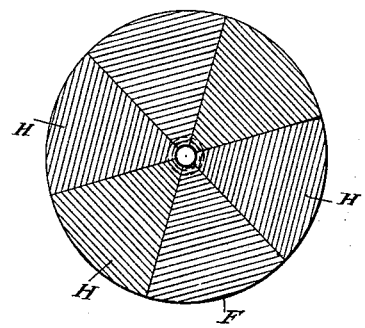
Figure 3:
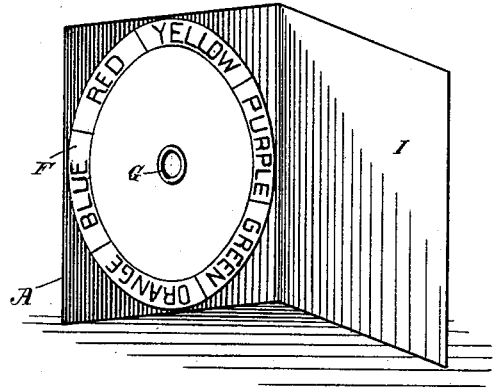

Referring to the drawings, Figure 1 is a front view of a device for testing color-blindness which embodies my invention. Fig. 2 is a view of the inside face of the color-disk. Fig. 3 is a view of the rear side of the device.

The letter A represents a piece of cardboard or other suitable material, which is cut preferably square. The front of this card is divided into four squares, two of which, B B, are black, and two, C D, are white. In the center of the square C, and through the card, is cut the color-opening E, which may be of a star or any other desired shape.

Upon the rear side of the card A is the color-disk F, which is held in place at its center by and permitted to readily turn on the eyelet G. The face of this disk next the rear face of the card A is divided into six angular spaces, H, upon which spaces three primary and three secondary colors are placed. Upon the rear side of this disk, Fig. 3, and opposite these spaces, are placed the names of the colors, so that any color may be brought to fill the opening E.

I is a flap that serves to cover and protect the disk F, and upon which may be printed directions for the use of the apparatus, or any other matter that it may be desirable to exhibit in connection with the device.

In using the apparatus any one of the color-spaces on the disk is turned to fill the color-opening, thus producing a color-spot surrounded by white. This spot should now be viewed steadily for about one-half a minute in order to strongly establish persistency of vision, after which the gaze should be steadily directed to the center of the white square beneath the color-spot square, and if the organs of sight be normal there will appear upon this lower white square a faint spot having the color that is complementary of that of the color-spot. Failure to discern the complementary color indicates, of course, color-blindness as to that color, and the comparative ease or difficulty with which any one person will discover the various complementary colors or tints will indicate the power of the organs of vision relatively to all colors.

I prefer to divide the front of the card as shown—that is, to separate the white spaces C and D by the black spaces B B. This makes a strong contrast, whereby the complementary color or tint will be most effectually brought out, and tends to assist a weak power of discernment of color to the fullest extent.

The number of colors upon the color-disk is not essential. I have shown, as the preferred form, a disk having the primary and secondary colors; but a less number may be used, or to these primaries and secondaries may be added any number of tints. So, too, the exact shape and arrangement of the parts of the color-disk are not essential, as this disk may be divided into separate parts, each carrying a color-spot, or otherwise variously arranged relatively to the opening in the card through which the colors are to be viewed, and so that the different color-sections may be brought before such opening. It is obvious, also, that the card-board may be substituted by any other suitable material which affords a plane surface, and that the shape of the card may be variously changed from the form here shown.

What is claimed as new is—

1. In an apparatus for testing for color-blindness, the combination of two adjustably-attached cards or surfaces, one made up of different color-sections, and the other containing an opening or aperture upon a white surface, the card containing the color-sections being arranged so that the several sections can be brought to pass beneath the opening of the other card.

2. In an apparatus for testing for color-blindness, a card, A, provided with a plain white space, D, and with a white space, C, surrounding an opening, E, in combination with color-sections H, secured to the card and adapted to be passed under the said opening.

3. In combination, the card A, provided with the black spaces B B and with the white spaces C D, one of which has the opening E, and the color-disk F, adjustably secured to the card, so that its color-sections may be passed under the said opening E.

LUCIUS T. STANLEY.

Witnesses:
F. E. HARTLEY,
R. F. GAYLORD.